United States Patent [19]
Pflager et al.

[11] Patent Number: 6,110,010
[45] Date of Patent: Aug. 29, 2000

[54] DRIVE AND SUPPORT FOR MACHINE TOOLS

[75] Inventors: William Pflager, Waynesboro; Joel Metzler, Greencastle, both of Pa.

[73] Assignee: UNOVA IP Corp., Woodland Hills, Calif.

[21] Appl. No.: 08/859,318

[22] Filed: May 20, 1997

Related U.S. Application Data

[60] Provisional application No. 60/018,932, May 21, 1996.

[51] Int. Cl.7 ................................................ B24B 49/00
[52] U.S. Cl. ........................... 451/11; 451/10; 451/62; 451/150; 451/166; 310/12; 318/568.17; 318/566
[58] Field of Search .................... 451/9, 10, 11, 451/28, 62, 213, 215, 218, 137, 150, 152, 156, 157, 166, 397, 398, 399; 310/12, 68; 318/560, 566, 568.17, 3, 568.2, 687

[56] References Cited

U.S. PATENT DOCUMENTS

| | | |
|---|---|---|
| 3,619,013 | 11/1971 | Jones . |
| 3,710,466 | 1/1973 | Williamson et al. . |
| 4,653,360 | 3/1987 | Compton . |
| 4,839,545 | 6/1989 | Chitayat . |
| 4,987,526 | 1/1991 | Slocum et al. ........................ 364/167.02 |
| 4,990,840 | 2/1991 | Migda . |
| 5,072,399 | 12/1991 | Laws et al. . |
| 5,357,158 | 10/1994 | Takei . |
| 5,416,397 | 5/1995 | Mazzara et al. . |
| 5,432,422 | 7/1995 | Nagano et al. . |
| 5,730,643 | 3/1998 | Bartlett ........................................ 451/8 |

FOREIGN PATENT DOCUMENTS

| | | |
|---|---|---|
| 4319359 | 8/1972 | Germany . |
| 19531507 | 6/1995 | Germany . |

*Primary Examiner*—Eileen P. Morgan
*Attorney, Agent, or Firm*—Hoffman, Wasson & Gitler, P.C.

[57] ABSTRACT

An improved drive and support for a machine tool by which a part thereof can be supported and driven along a linear path for machining. The drive and support includes a linear slideway having a magnetic track along which a housing will move when a moving magnetic field is generated in an electromagnetic assembly mounted in the housing. The direction the housing moves depends upon the direction of movement of the generated magnetic field, and first hydrostatic bearing pads acting between the housing and the slideway, or between the electromagnetic assembly and the track or any combination thereof, to counteract the attractive force between the electromagnet and the track.

51 Claims, 4 Drawing Sheets

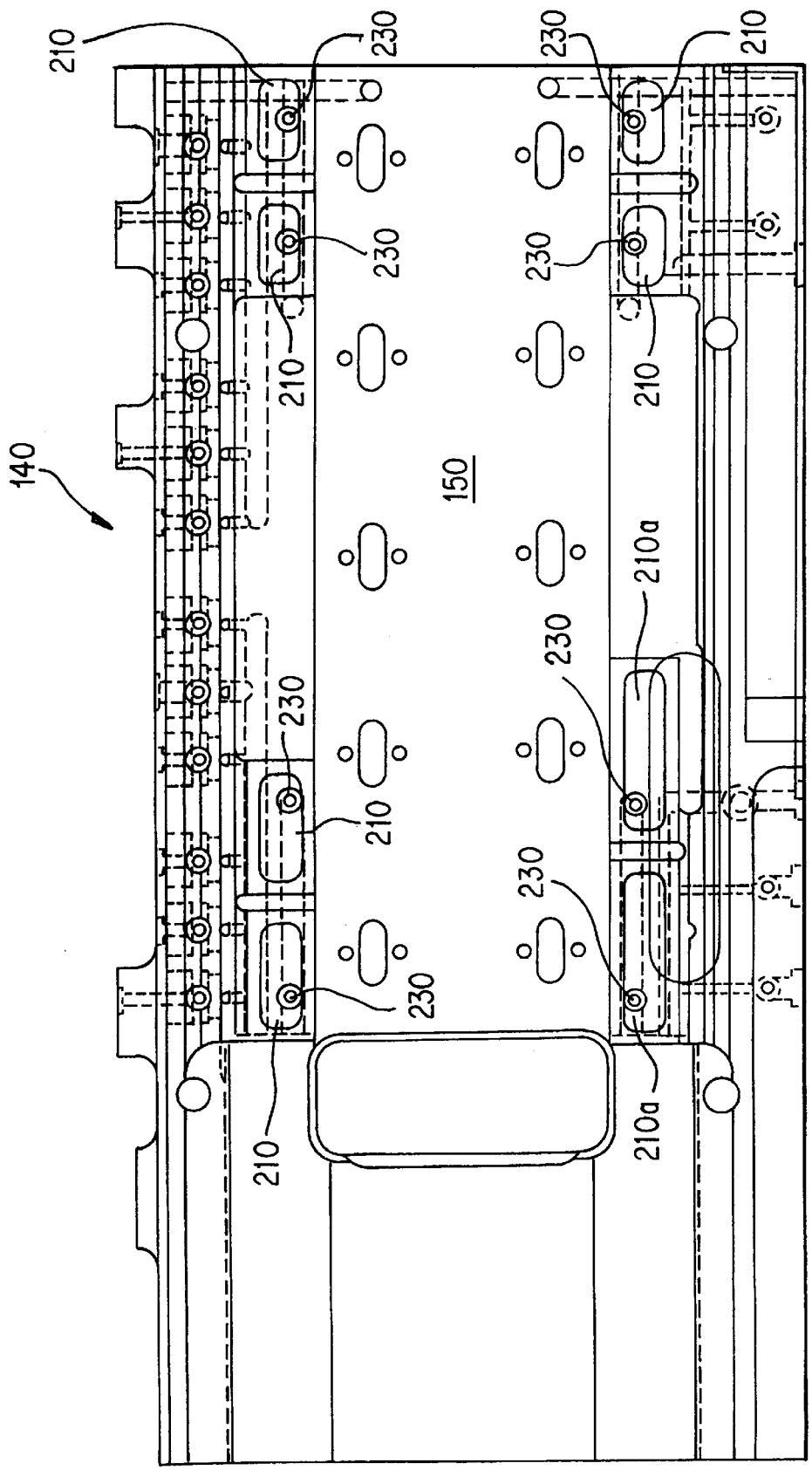

DRIVE AND SUPPORT FOR MACHINE TOOLS

This Appln claims the benefit of U.S. Provisional No. 60/018,932 May 21, 1996.

FIELD OF THE INVENTION

This invention relates to machine tools and, in particular, to tool carriages which carry and position a tool(s) for use with respect to a workpiece, and to workpiece carriages which carry and position a workpiece(s) with respect to the tool so that work can be performed on the workpiece(s): and, more especially, to the mounting of such carriages to the support structure of the machine tool therefore and the drives for effecting movement of such carriages with respect to their respective support structure and, when appropriate, to each other.

BACKGROUND OF THE INVENTION

Machining processes typically require a workpiece, such as a camshaft, to be mounted between a headstock and a tailstock each carried by a workpiece carriage disposed for linear movement along ways, slides or tracks carried by the bed of a machine tool. The workpiece is usually carried by the headstock and tailstock for rotational movement about an axis of rotation passing through at least a part of the workpiece. The worktool for such machining processes, which may be a grinding wheel for example, is also mounted to or carried by a carriage which is also disposed for linear movement along ways, slides or tracks carried by the bed of the machine tool. A grinding wheel worktool would be carried by its tool carriage for rotation about its axis of rotation.

The linear movement required for such carriages is usually such that the carriages are moved from home position in a first direction, possibly in increments, and then returned in the opposite direction to or towards the home position, possibly in increments also. It is commonplace to accomplish such linear carriage motion through conventional mechanisms such as ball screws, linear motors, or similar devices. Some worktool carriages are, in turn, mounted upon another carriage so that the worktool can be moved in directions parallel to the workpiece as well as in directions perpendicular too the workpiece.

Relative movement between such carriages and their respective supporting ways, slideways, tracks or the like also requires the use of bearings or bearing surfaces on or between the carriage and its supporting structure. The incorporation of such bearings and/or bearing surfaces, however, more often then not may also permit the carriage to twist and turn in horizontal and vertical and rotational manner with respect to its mounting on the machine tool; especially in reaction to forces developed when the tool is in contact with the workpiece. Twisting and turning of the carriage and the workpiece carried by the carriage with respect to the worktool often results in improperly machined and unacceptable workpieces.

The stiffer the bearing arrangement between the carriage and its support structure the better the machining. It has been proposed to increase the stiffness of relatively movable machine tool components by utilizing hydrostatic type bearings between relatively moving surfaces thereof. However, hydrostatic bearing design quite often requires the creation of secondary surfaces in a plane or planes parallel to the intended bearing surfaces and the application of hydrostatic fluid to those secondary surfaces to generate fluid pressure in directions opposite to that of the fluid pressure between the intended bearing surfaces in order to obtain an effective hydrostatic bearing arrangement and maintain an optimal gap spacing between the primary bearing surfaces. the creation of those secondary surfaces and the provision of passageways to provide hydrostatic fluid thereto not only results in design problems for the machine components but also may unduly and unacceptably increase the cost of machining the component.

It has also been proposed to utilize linear electromagnetic type drives (i.e., linear motors) to effect movement of the machine tool carriages on these respective slides, slideways or tracks. However, some such linear motors general considerable attractive forces between their coil assemblies and magnetic plates and therefore require heavy duty bearing arrangements in order to function properly and effectively.

SUMMARY OF THE PRESENT INVENTION

It is an object of the present invention to provide an improved combined drive and support for a machine tool by which a part thereof can be supported and driven along a linear path to facilitate the machining of workpieces.

According to one aspect of the present invention, a combined drive and support, as aforesaid, comprises: a linear slideway having a magnetic track along which a carriage will move in one direction or the other when a moving magnetic field is generated by an electromagnet assembly mounted in the carriage, depending upon the direction of movement of the generated magnetic field, and first hydrostatic bearing means acting between the carriage and the slideway (or between the electromagnet assembly and the track or any combination thereof) are effected and facilitated by the attractive force between the electromagnet and the track.

In a preferred arrangement, the slideway also includes rigid elongate flanges or rails running parallel to the slideway, or track, and presenting spaced apart vertical faces which cooperate with opposed spaced vertical faces of a housing part, or extensions thereto, to increases the stiffness of the bearing arrangement to limit the tendency of the carriage to tilt relative to the line of motion defined by the slideway. Second hydrostatic bearing means may be provided to advantage between the said opposed vertical faces.

In another embodiment of the invention additional hydrostatic bearing means may be provided acting in the same sense as the force of attraction between the electromagnet and the track. This additional hydrostatic bearing may be constructed by way of hydrostatic pads situated in appropriate elongate flat faces formed on or in extensions to or additional parts secured to the extending frame, the slideway, or a rigid machine part to which the slideway is attached or of which the slideway forms a part such as a machine bed.

The fluid pressure in the additional hydrostatic bearing means is preferably made at least in part dependent upon the pressure in the first hydrostatic bearing means, so as to provide a stabilizing effect.

The additional hydrostatic bearing means may alternatively be located between the electromagnet assembly and the carriage, so that when in use, the former is hydrostatically isolated from the carriage and the carriage is itself hydrostatically isolated from the slideway.

Where the weight of the carriage assembly (including any tool or workpiece mounted thereon) is considerable, and where the attractive force between the electromagnet assembly and the track is sufficiently great (and acts in the same sense as the weight component of the housing etc.), the additional hydrostatic bearing means may not be required or may only be needed to provide a damping force to reduce instability during operation, such as caused by varying machining forces, which because of the air gap provided between the electromagnet assembly and the track can permit vibration of the carriage assembly to occur, relative to the slideway/track.

In yet another alternative arrangement an electromagnetic assembly may be selected, having upper and lower parallel driving faces, each of which will, when located relative to a magnetic track, produce linear movement of the assembly relative to the track, and the electromagnet assembly may be mounted in the carriage so as to be fully floating between the slideway track, and a second similar (but shorter) track, which is mounted parallel to the first track, within the carriage and is secured to the carriage. By constraining the electromagnet assembly within the carriage so as to be incapable of relative fore and aft movement but to be capable of limited relative movement perpendicular to the fore and aft movement of the carriage to the extent permitted by air gaps between the slideway track on the one hand, and the carriage on the other hand, so the net electromagnetic force acting on the carriage will be in a fore or aft direction thereby effecting the desired linear movement.

Preferably the force between the assembly and the carriage track is opposite in sense to that between the assembly and the slideway track, and have inverse magnitude versus gap-size characteristics, so as to introduce electromagnetic damping of any vibration introduced due to machining or other forces.

The invention envisages the combination of hydrostatic damping an electromagnetic damping if desired, by the use of both when required.

The invention also lies in a machine tool comprising a stationary base and at least one slidable member (carriage) movable linearly relative to the base by a combined support and drive means as aforesaid.

The accompanying drawings show a slideway for a machine tool part which is to be moved along the slideway and which incorporates a linear electromagnetic drive, such as might be supplied by Indramat GmbH, and hydrostatic bearing, between the slideway and movable machine tool part, the operation of which is facilitated and effected by the attractive forces produced between the electromagnetic drive parts, and further modifications incorporating additional hydrostatic bearings to increase stiffness and/or introduce damping and/or isolation of component parts. The linear motors can also be of the type supplied by Anorad Corporation or NSK USA.

It is an advantage to utilize a linear motor as aforesaid into a carriage and slideway assembly of a machine tool in which hydrostatic bearings are required to increase the stiffness of the carriage and slideway assembly, since by doing so the need for conventional hydrostatic bearing pads which are otherwise needed to oppose primary bearing pads may be obviated or reduced to the need for damping pads only.

BRIEF DESCRIPTION OF THE DRAWINGS

The foregoing and other objects and attributes of the present invention will be described with respect to the following drawings in which:

FIG. 4 is a plan view of the underside of the tool carriage of FIGS. 2 and 3.

DETAILED DESCRIPTION OF THE PREFERRED EMBODIMENT

Figure 1:
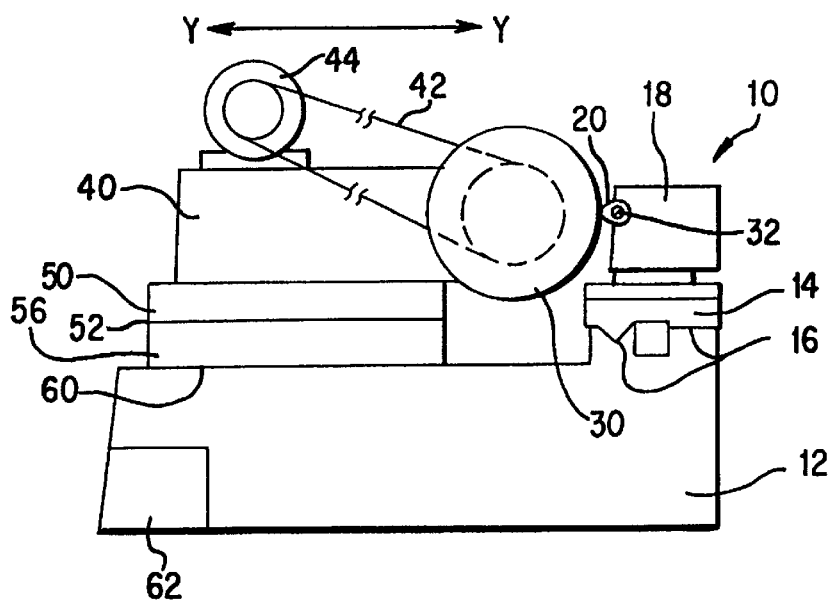
FIG. 1 is a schematic side elevational view of a machine tool of the type which could incorporate the present invention.

Referring to FIG. 1, there is generally shown a machine tool in the form of a grinding machine 10 having a bed or base 12 which, in turn, carries a workpiece carriage 14 carried by the base 12 to move in the direction of arrows X—X along a set of spaced track guides or slideways 16 provided on an upper surface of bed 12 in conventional construction and manner. A headstock (not shown) and a tailstock 18, both of conventional construction, are carried by workpiece carriage 14 to mount therebetween a workpiece 20 for coaction with a grinding wheel 30 and to rotate workpiece 20 while being ground by the grinding wheel 30. Workpiece 20 in this instance is a camshaft mounting a plurality of cams 32.

Grinding wheel 30 is rotatively carried by a wheelhead 40 also disposed on machine base 12, and is driven by belt 42 powered from a motor 44 also carried by wheelhead 40. Wheelhead 40 includes a carriage 50 slideably disposed to move in the directions of arrows Y—Y along guides, tracks or slideways 52 carried on another upper surface of base or bed 12. Tracks or slideways 52 are also of conventional construction and are disposed atop base 12 in conventional manner to guide and facilitate the movement of tool carriage 50 and grinding wheel 30 in the directions of arrows Y—Y to effect and facilitate grinding of cams 32 on workpiece 20. In some machine tool configurations an undercarriage 56 would mount slideways 52 to facilitate movement of the grinding wheel 30 towards and away from the workpiece 20 and would itself be mounted for movement along a similar set of tracks or guideways 60 carried by machine bed 12 but so that undercarriage 56 is disposed to move in the direction of arrows X—X to position grinding wheel 20 for coaction with other segments of workpiece 20.

Suitable and conventional controls 62, preferably CNC controls are provided to control the movement of carriages 14, 40 and 56, as well as motor 44, rotation of workpiece 20, and other functions of machine 10.

Figure 2:
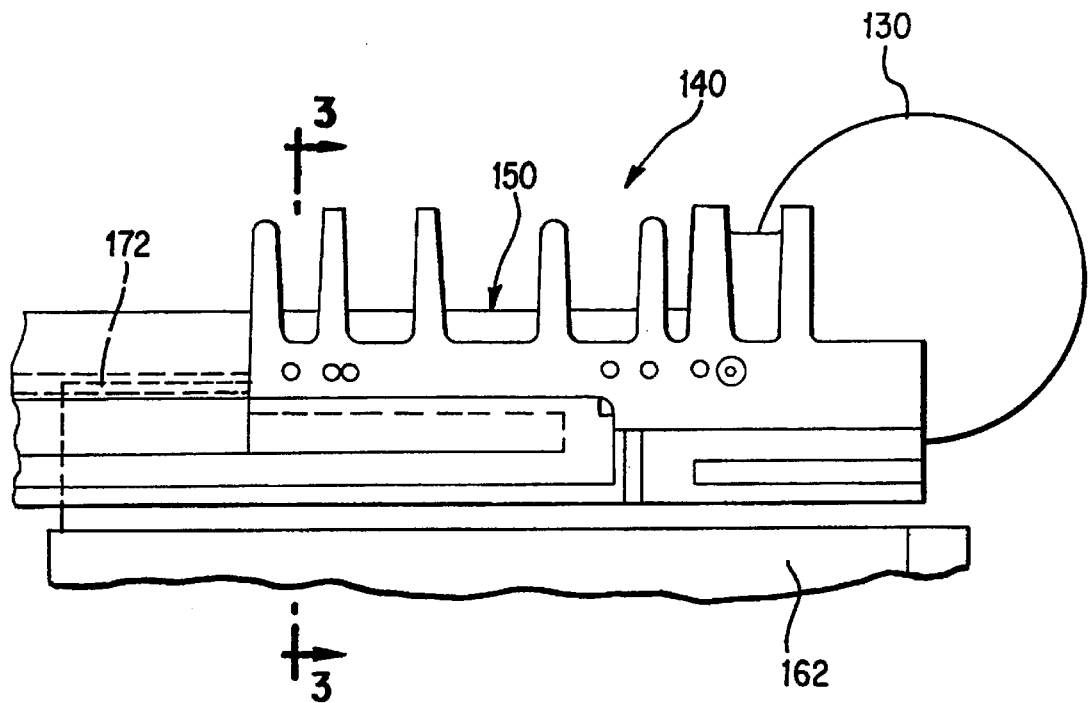
FIG. 2 is a side elevational view of a tool carriage, incorporating the drive and bearing arrangement of the instant invention, carried by the slideway of a machine tool such as one of the type schematically shown in FIG. 1.
Figure 3:
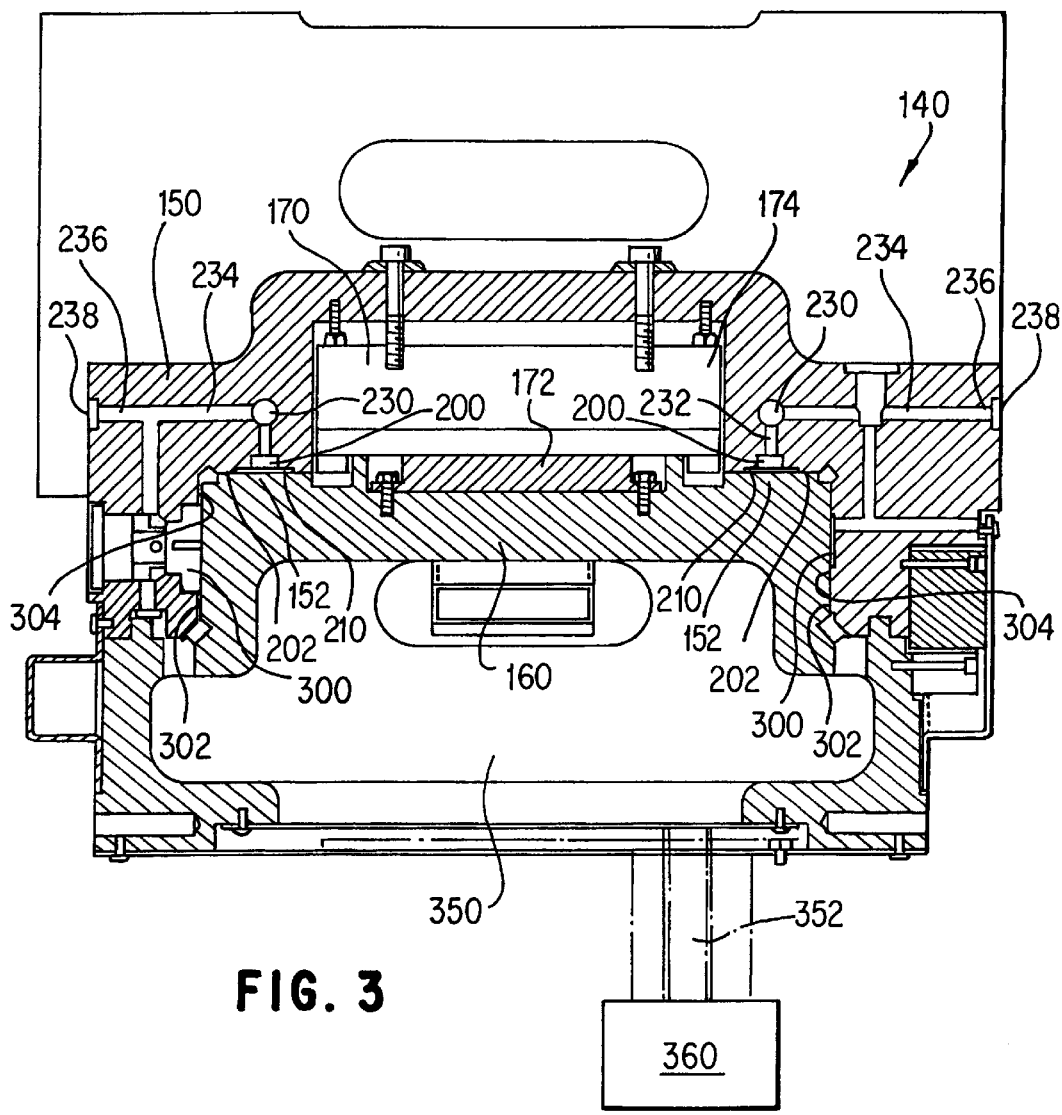
FIG. 3 is a sectional view taken along line 3—3 of FIG. 2, enlarged to better show details of the drive bearing arrangement of the instant invention.

Workhead 140, shown in FIGS. 2–4, incorporating the present invention, rotatively mounts a grinding wheel 130 for coaction with a workpiece (not shown) that is itself rotatively mounted between a headstock and a tailstock by a workpiece carriage in a manner similar to that described above for workpiece 20. Work carriage 150 of workhead 140 is positioned above and for coaction with a pair of spaced rails 152, shown in FIG. 2, of a work carriage slideway 160, shown in FIGS. 2 and 3, suitably and conventionally carried by a machine bed 162, shown in FIG. 2, to facilitate movement of work carriage 150 in the directions of arrows X—X. A primary or electromagnet coil assembly 170, shown in FIGS. 2 and 3, is carried by carriage 150 so as to face but be spaced from a secondary or permanent magnet plate or set of plates 172 disposed on top of the slideway 160 between rails 152 thereof and extending the length of the slideway 160. The permanent magnet plates 172 form a magnetic track which may also be an induction track, or which may be formed from electromagnets properly charged to coact with the primary 170. Primary 170 and secondary 172 thus form and provide a linear motor 174 for wheelhead 140 and wheel or tool carriage 150. Similar linear motors may also be provided for an undercarriage if one is provided for wheel carriage 150 and for the work carriage. The linear motor may otherwise be of conventional construction, conventionally powered and controlled to provide the required movements for the tool carriage, undercarriage and/or work carriage.

Figure 6:
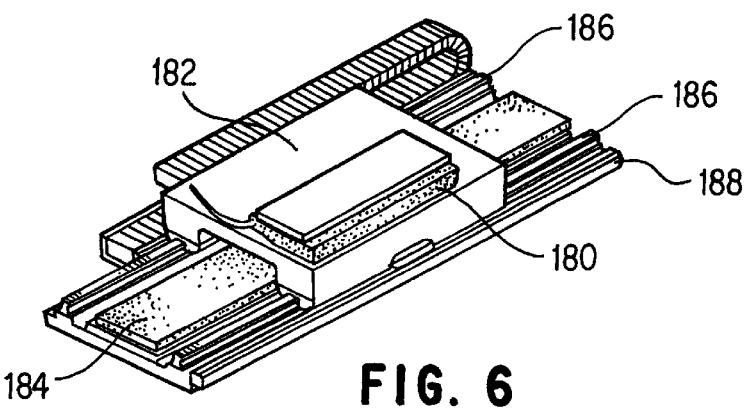
FIG. 6 is a schematic perspective view of a linear motor of the type incorporated into the instant invention.

A schematic of a conventional linear motor is shown in FIG. 6, wherein a primary 180 is housed within a carriage 182 so as to face and coact with a secondary 184 disposed between spaced rails 186 of a slideway 188.

Tool carriages, undercarriages, work carriages and the like require bearing arrangements between the carriage, such as carriage 150, and the slideway, such as the slideway 160. A comparatively stiff bearing is provided between carriage 150 and slideway 160 by forming hydrostatic bearings 200 between the surfaces of rails 152 and surfaces 202 of carriage 150. A plurality of hydrostatic pads 210, shown in FIGS. 3 and 4, are formed in surfaces 202 of carriage 150 proximate each corner thereof. Pads 210 are elongated as shown more clearly in FIG. 4 and are of an appropriate and relatively shallow depth for hydrostatic purposes. It should be noted that pads 210a are of a greater elongation then the other pads 210 to provide extra fluid support for grinding wheel 130 at that location on workhead 140.

An opening or port 230 opens into each pad 210, 210a and extends therefrom into fluid passageways 232 and 234, shown in FIG. 3, which terminate respectively at couplings 236 of a size and configuration to accept fluid conduits 238, the other ends of which are connected to a source of hydrostatic fluid such as a manifold, pump or reservoir (not shown) of conventional construction and operation. Suitable and conventional controls are provided to develop and maintain a fluid pressure appropriate for relatively stiff hydrostatic bearings.

Figure 5:
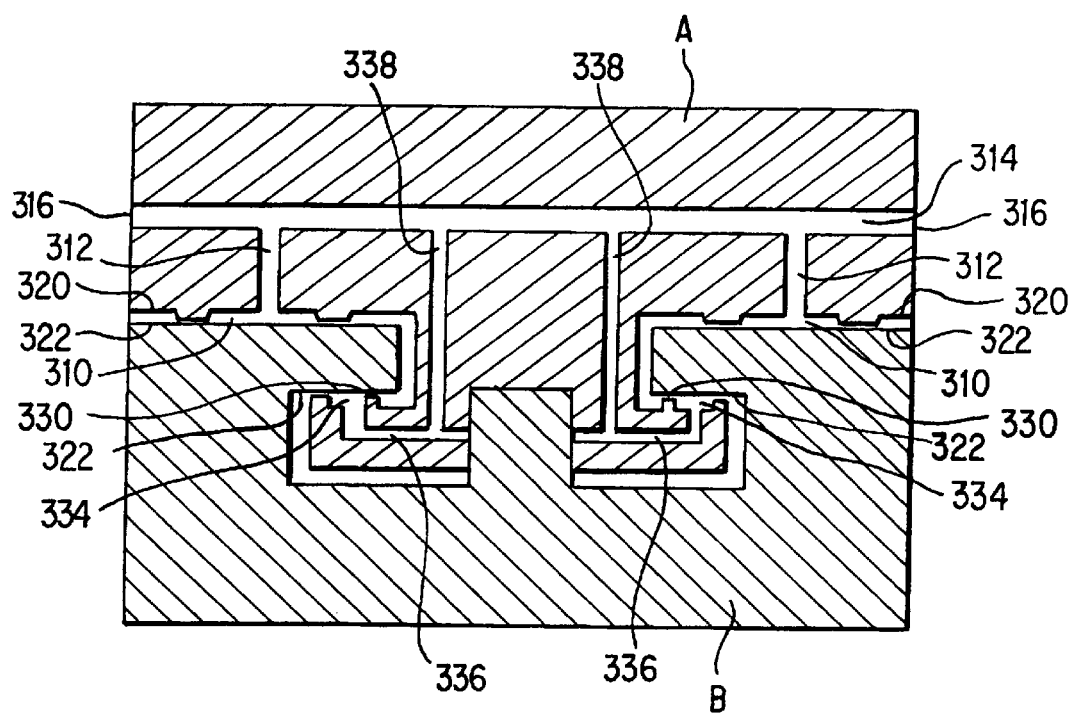
FIG. 5 is a schematic sectional view of a conventional hydrostatic bearing arrangement of the type utilized for tool carriages and/or work carriages of machine tools.

Pads 210, 210a correspond to pads 310, shown in FIG. 5, of a part A of the schematic conventional hydrostatic bearing arrangement of FIG. 5 which is provided to better understand the instant invention in comparison to conventional hydrostatic bearing arrangements. Fluid passageways 312 extend from pads 310 to another fluid passageway 314 which receives hydrostatic fluid at entries 316 from a suitable source of fluid appropriate for hydrostatic bearing uses and under suitable pressures and controls. Fluid from pads 310 forms a hydrostatic bearing between facing surfaces 320 of part A and 322 of part B so that part A can be moved in the direction of arrows X—X with respect to part B (i.e. into and out of the figure). The greater the fluid pressure the stiffer the hydrostatic bearing.

The hydrostatic bearing pads 310 may be isolated from the fluid passageways 312 and 314 by conventional restrictors (not shown) to prevent the system from locking up.

Hydrostatic bearings, however, must be pre-loaded to maintain an appropriate gap spacing between the opposed bearing surfaces. If the gap is too narrow the bearing will not function properly and if the gap is too large the fluid will simply pour out and the bearing will lose its stiffness. In conventional hydrostatic bearings a "pre-load" is provided by fabricating a set of "pre-load" surfaces 330, 332 with fluid pads 334 formed in the surface 330. Fluid passageways 336, 338 direct the hydrostatic fluid to "pre-load" pads 334. The fluid pressure provided by pads 310 act against surfaces 322 of part B and the reactive forces generated thereby act to separate parts A and B, but if part B is fixedly disposed then those forces will tend to move part A away from part B, modified to a slight degree by the weight of part A. The "pre-load" forces generated by fluid pressure acting against surfaces 332 of part B, on the other hand, generate reactive forces between surfaces 330, 332 which tend to draw part A towards part B. A controlled "pre-load" can thus provide an effective control for the gap spacing between the bearing surfaces of a hydrostatic bearing.

Utilization of conventional hydrostatic bearings thus requires designing the moving part to provide for "pre-load" surfaces, hydrostatic fluid pads and passageways as well as the expense of machining those surfaces, pads and passageways into the moving part.

Conventional linear motors, such as the one shown in FIG. 6 and linear motor 174 of the instant invention, may generate strong attractive forces between the primary and the secondary. Thus, by the selection of the appropriate linear motor, one that so generates a strong attractive force between the primary and the secondary, the instant invention provides its own "pre-load" for the hydrostatic bearings and eliminates the requirement for "pre-load" surfaces, hydrostatic pads, passage-ways and fluid for those "pre-load" pads and passageways.

Linear motor 174 of the instant invention has thus been selected to provide an attractive force between the primary 170, carried by tool carriage 150, and secondary 172, fixedly carried by slideway 160, which when augmented by the force from the weight of the workhead 140, provides an appropriate and suitable "pre-load" for hydrostatic bearings 200. In this instance, linear motor 174 generates an attractive force of approximately 7,000 lbs. Linear motors which generate greater or lesser attractive forces between their respective primaries and secondaries may also be utilized depending upon the required stiffness of the hydrostatic bearing(s). Greater attractive forces permit greater fluid pressure for hydrostatic bearings and thus stiffer hydrostatic bearings.

Additional hydrostatic bearings 300, shown in FIG. 3, are provided between vertical surfaces 302 of tool carriage 150 and vertical surfaces 304 of slideway 160. Hydrostatic pads 310, similar to pads 210 but not necessarily of the same circumferential configuration are formed in vertical surfaces 302 either at the respective ends of the carriage 150 or so as to be distributed from end to end thereof. Suitable hydrostatic fluid is provided to pads 310 through ports and passageways 320 from an appropriate supply of hydrostatic fluid under control from suitable conventional hydrostatic fluid pumps and controls. The hydrostatic fluids which exit bearings 200 and 300 drain into cavity 350 provided in slideway 162 and then drain therefrom through a conduit 352 into a reservoir 360 which may be equipped with suitable and appropriate circulating pumps and controls to maintain the desired pressure for hydrostatic bearings 200 and 300. If desired attractive forces of the type described above for bearings 200 may also be provided for either or both hydrostatic bearings 300 to "pre-load" those bearings.

Further hydrostatic pads (not shown) may be provided for pads 210, 210a, for damping purposes with respect to bearings 200, but arranged and positioned as though utilized for "pre-load" purposes. Suitable fluid for hydrostatic uses would be supplied to such damping pads through suitably provided passage-ways. Moreover, and if forces additional to the attractive forces of the linear motor 174 are required, the further hydrostatic pads may be utilized for "pre-load" purposes as well as or instead of for damping purposes.

Having described the preferred embodiments of the present invention, it is believed that other modifications, variations and changes will be suggested to those skilled in the art in view of the description set forth above. It is therefore to be understood that all such variations, modifications and changes are believed to fall within the size of the present invention as defined in the appended claims.

What is claimed is:

1. A carriage drive and mounting for a carriage and slideway, wherein said carriage is carried by said slideway for movement along said slideway between a first slideway location and a second slideway location and various slideway locations therebetween, comprising:

(a) linear motor drive means including a primary drive means and a secondary drive means one of which is carried by said carriage and the other of which is carried by said slideway;

(b) said carriage including a first hydrostatic bearing surface and said slideway including a second hydrostatic bearing surface;

(c) hydrostatic fluid means providing hydrostatic fluid for said first hydrostatic bearing surface and said second hydrostatic bearing surface;

(d) said first hydrostatic bearing surface and said second hydrostatic bearing surface and said hydrostatic fluid means coacting to provide a hydrostatic bearing means between said carriage and said slideway to facilitate movement of said carriage; and (e) said primary drive means and said secondary drive means of said linear motor drive means coacting to provide a predetermined attractive force of predetermined magnitude and predetermined direction and which facilitates functioning of said hydrostatic bearing means.

2. A carriage drive and mounting as recited in claim 1, wherein said primary drive means is carried by said carriage and said secondary drive means is carried by said slideway.

3. A carriage drive and mounting as recited in claim 2, wherein said secondary drive means extends from said first slideway location to said second slideway location.

4. A carriage drive and mounting as recited in claim 3, wherein said secondary drive means includes a plurality of permanent magnet plates and said primary drive means includes an electromagnet.

5. A carriage drive and mounting as recited in claim 2, wherein said first hydrostatic bearing surface includes a plurality of hydrostatic fluid pads.

6. A carriage drive and mounting as recited in claim 5, wherein a pair of said plurality of hydrostatic fluid pads are disposed proximate each end of said hydrostatic bearing surface.

7. A carriage drive and mounting as recited in claim 6, wherein said first hydrostatic bearing surface includes a pair of spaced coplanar surfaces provided on said carriage for coaction with a corresponding pair of spaced coplanar surfaces provided on said slideway.

8. A carriage drive and mounting as recited in claim 7, wherein said coplanar surfaces of said carriage and said slideway are horizontally disposed.

9. A carriage drive and mounting as recited in claim 2, wherein said predetermined direction of said predetermined attractive force is opposite to a direction of a predetermined hydrostatic force of said hydrostatic bearing means.

10. A carriage drive and mounting as recited in claim 9, wherein said predetermined attractive force comprises a pre-load force for said hydrostatic bearing means.

11. A carriage drive and mounting as recited in claim 10, further comprising second hydrostatic bearing means acting in a direction perpendicular to said first hydrostatic bearing means.

12. A carriage drive and mounting as recited in claim 2, wherein said carriage and said carriage drive are for a tool carriage of a machine tool.

13. A carriage drive and mounting as recited in claim 12, wherein said machine tool is a grinding machine.

14. A carriage drive and mounting as recited in claim 2, wherein said carriage and said carriage drive are for a workpiece carriage of a machine tool.

15. A carriage drive and mounting as recited in claim 14, wherein said machine tool is a grinding machine.

16. A carriage drive and mounting as recited in claim 2, wherein said carriage and carriage drive support a tool carriage of a machine tool.

17. A carriage drive and mounting as recited in claim 16, wherein said machine tool is a grinding machine.

18. A machine tool including a slideway and a carriage carried by said slideway for movement along said slideway between a first slideway location and a second slideway location and various slideway locations therebetween, comprising:

(a) a linear motor drive including a primary drive and a secondary drive one of which is carried by said carriage and the other of which is carried by said slideway;

(b) said carriage including a first hydrostatic bearing surface and said slideway including a second hydrostatic bearing surface;

(c) hydrostatic fluid provided for said first hydrostatic bearing surface and said second hydrostatic bearing surface;

(d) said first hydrostatic bearing surface and said second hydrostatic bearing surface and said hydrostatic fluid coacting to provide a hydrostatic bearing between said carriage and said slideway to facilitate movement of said carriage; and (e) said primary drive and said secondary drive of said linear motor drive coacting to provide a predetermined attractive force of predetermined magnitude and predetermined direction and which facilitates functioning of said hydrostatic bearing.

19. A machine tool as recited in claim 18, wherein said primary drive is carried by said carriage and said secondary drive is carried by said slideway.

20. A machine tool as recited in claim 19, wherein said secondary drive extends from said first slideway location to said second slideway location.

21. A machine tool as recited in claim 20, wherein said secondary drive includes a plurality of permanent magnet plates and said primary drive includes an electromagnet.

22. A machine tool as recited in claim 19, wherein said first hydrostatic bearing surface includes a plurality of hydrostatic fluid pads.

23. A machine tool as recited in claim 22, wherein a pair of said plurality of hydrostatic fluid pads are disposed proximate each end of said hydrostatic bearing surface.

24. A machine tool as recited in claim 23, wherein said first hydrostatic bearing surface includes a pair of spaced coplanar surfaces provided on said carriage for coaction with a corresponding pair of spaced coplanar surfaces provided on said slideway.

25. A machine tool as recited in claim 24, wherein said coplanar surfaces of said carriage and said slideway are horizontally disposed.

26. A machine tool as recited in claim 19, wherein said predetermined direction of said predetermined attractive force is opposite to a direction of a predetermined hydrostatic force of said hydrostatic bearing.

27. A machine tool as recited in claim 26, wherein said predetermined attractive force comprises a pre-load force for said hydrostatic bearing.

28. A machine tool as recited in claim 27, further comprising second hydrostatic bearing acting in a direction perpendicular to said first hydrostatic bearing.

29. A machine tool as recited in claim 19, wherein said carriage and said carriage drive are for a tool carriage of said machine tool.

30. A machine tool as recited in claim 29, wherein said machine tool is a grinding machine.

31. A machine tool as recited in claim 19, wherein said carriage and said carriage drive are for a workpiece carriage of said machine tool.

32. A machine tool as recited in claim 31, wherein said machine tool is a grinding machine.

33. A machine tool as recited in claim 19, wherein said carriage and carriage drive support a tool carriage of said machine tool.

34. A machine tool as recited in claim 33, wherein said machine tool is a grinding machine.

35. A method of mounting and driving a carriage on a slideway wherein said carriage is to be moved between a first slideway location and a second slideway location and a plurality of slideway locations therebetween, comprising the steps of:

(a) providing a linear motor means having a primary drive means and a secondary drive means and which has an attractive force between said primary drive means and said secondary drive means to operate between said carriage and said slideway;

(b) providing a hydrostatic bearing means between said carriage and said slideway; and (c) utilizing said attractive force between said primary drive means and said secondary drive means of said linear motor to pre-load said hydrostatic bearing.

36. A method as recited in claim 35, comprising the further step of carrying said primary drive means by said carriage and carrying said secondary drive means by said slideway.

37. A method as recited in claim 35, further comprising the step of providing said secondary drive means extending from said first slideway location to said second slideway location.

38. A method as recited in claim 37, further comprising the steps of providing a plurality of permanent magnet plates as said primary drive means and providing an electromagnet as said secondary drive means.

39. A method as recited in claim 37, further comprising the step of providing a plurality of hydrostatic fluid pads in said first hydrostatic bearing surface.

40. A method as recited in claim 39, further comprising the step of providing a pair of said plurality of hydrostatic fluid pads proximate each end of said hydrostatic bearing surface.

41. A method as recited in claim 40, further comprising the steps of:

providing said first hydrostatic bearing surface with a pair of spaced coplanar surfaces on said carriage; and providing said slideway with a corresponding pair of spaced coplanar surfaces for coaction with said pair of spaced coplanar surfaces on said carriage.

42. A method as recited in claim 41, further comprising the step of disposing said coplanar surfaces of said carriage and said slideway horizontally.

43. A method as recited in claim 36, further comprising the step of providing said predetermined direction of said predetermined attractive force so as to be opposite a direction of a predetermined hydrostatic force of said hydrostatic bearing means.

44. A method as recited in claim 43, further comprising the steps of providing said predetermined attractive force to comprise a pre-load force for said hydrostatic bearing means.

45. A method as recited in claim 44, further comprising the steps of providing a second hydrostatic bearing means acting in a direction perpendicular to said first hydrostatic bearing means.

46. A method as recited in claim 36, further comprising the steps of providing said carriage and said carriage drive for a tool carriage of a machine tool.

47. A method as recited in claim 46, wherein said machine tool is a grinding machine.

48. A method as recited in claim 36, further comprising the step of supporting a tool carriage of a machine tool with said carriage and carriage drive.

49. A method as recited in claim 48, wherein said machine tool is a grinding machine.

50. A method as recited in claim 36, further comprising the step of providing a tool carriage of a machine tool with said carriage and carriage drive.

51. A method as recited in claim 50, wherein said machine tool is a grinding machine.

* * * * *